Figure 1:
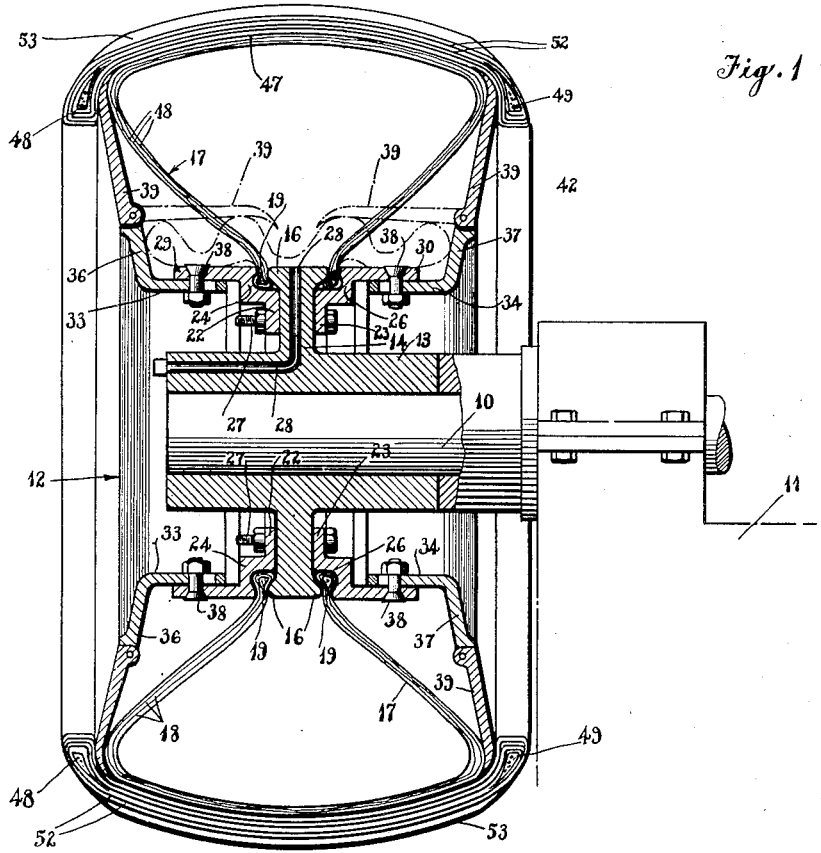

Aug. 22, 1933.　　J. F. CAMPBELL ET AL　　1,923,705
PNEUMATIC TIRE BUILDING CHUCK
Filed Sept. 29, 1930

Inventors
John F. Campbell and
James D. Thomson.

Attorneys

Patented Aug. 22, 1933

1,923,705

UNITED STATES PATENT OFFICE 1,923,705

PNEUMATIC TIRE BUILDING CHUCK

John F. Campbell and James D. Thomson, Akron, Ohio, assignors to The Goodyear Tire & Rubber Company, Akron, Ohio, a Corporation of Ohio Application September 29, 1930
Serial No. 484,999

14 Claims. (Cl. 154—9)

This invention relates to building pneumatic tires, and it has particular relation to a method and apparatus especially applicable for constructing tires of small diameter having inextensible beads.

One object of the invention is to provide a collapsible tire chuck extremely simple in construction and which may be quickly and easily manipulated from a tire-supporting, to a collapsed condition.

Another object of the invention is to provide a collapsible tire chuck in which an inflatable member is employed that has a slightly arcuate outer peripheral surface.

Another object of the invention is to provide a method of building a tire in which a portion of the tire material can be positioned on the chuck while the chuck is being manipulated to a tire-supporting position.

In constructing tires by the so-called flat-built method it is customary to assemble a plurality of plies of rubberized fabric in superposed relation on a cylindrical drum or chuck mounted to rotate about a horizontal axis. The width of the drum preferably is such that the edge portions of the fabric may extend beyond its edges and be turned inwardly against the sides thereof. Endless tire beads of smaller diameter than that of the drum are then assembled with the inwardly extending portions of the fabric. Although flat-built tires have proven very satisfactory, some difficulty has been encountered in manipulating them because of their width and in shaping or forming them prior to vulcanization. The difficulty in shaping the tires is due to the excessive strains imparted to the fabric which causes separation of the cords and very often breaking them at points where the tires ordinarily are subjected to the hardest service when employed on a motor vehicle.

According to this invention a method and apparatus are provided for building a tire carcass during which the tire is so constructed that its outer surface is laterally curved, and it resembles the finished tire more than the flat built tire does. The apparatus comprises a driven shaft provided with a hub having a radially disposed, outwardly projecting flange. An inflatable core substantially in the form of a tire is provided which is maintained fluid-tight by members secured to the radial flange. These members clamp the edges of the core against the flange. A plurality of resilient plates pivoted to the members limit the movement of the inflatable core and also provide suitable surfaces for stitching together the edge portions of the plies of tire material.

In building a tire in accordance with this invention an endless band comprising two-plies of tire material is positioned about the tire core when being expanded from a collapsed condition. Other plies of tire material are then built upon the endless band, assembled with beads, and the construction completed by adding a tread portion of rubber. Then the core is deflated and the tire is removed.

Figure 2:
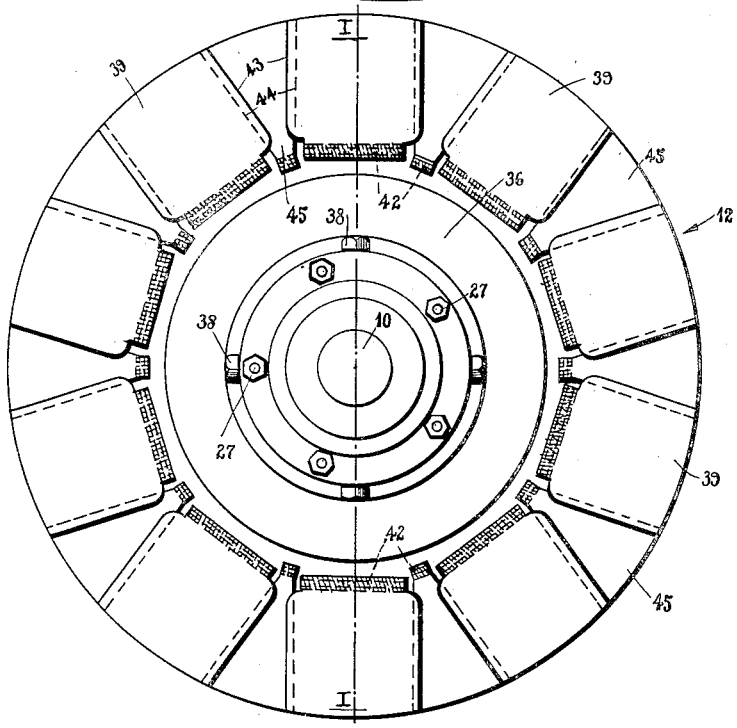

For a better understanding of the invention, reference may now be had to the accompanying drawing, forming a part of this specification in which:

Fig. 1 is a cross-sectional view, substantially along line I—I of Fig. 2 of a portion of a tire-building machine embodying a collapsible chuck constructed in accordance with the invention; and Fig. 2 is an end view of the tire building chuck shown by Fig. 1.

In the embodiment of the invention illustrated by the accompanying drawing a driven shaft 10 rotatably supported in a tire-building machine 11 constitutes the support for a tire chuck 12. A hub portion 13 having a radially disposed, outwardly projecting flange 14 intermediate its ends is rigidly secured to the shaft 10 and rotates therewith. Laterally projecting ribs 16 are provided on the sides of the flange 14 adjacent its outer periphery which are adapted to engage the edges of an inflatable core 17. The latter resembles a thin pneumatic tire in construction and is composed of a plurality of plies 18 of rubberized fabric material having bead portions 19 adjacent its inner peripheral edges. The bead portions of the core engage the ribs on the flange 14 and are maintained in fluid-tight relation against the latter by means of rings 22 and 23 having laterally and upwardly projecting flanges 24 and 26. These members are secured to the flange 14 by bolts 27. An opening 28 extending from the outer periphery of the flange 14 to the outer end of the hub 13 is provided to inflate or deflate the core 17. Axially projecting flange portions 29 and 30 integral with the rings 22 and 23 are provided to support annular members 33 and 34 having radially projecting flanges 36 and 37. The members 33 and 34 are rigidly secured to the flanges 29 and 30 by bolts 38.

A plurality of metal plates 39 are pivoted to the outer edges of the flanges 36 and 37 by spring hinges 42. Beveled edges 43 of the plates 39 overlap corresponding edges 44 of plates 45, (Fig. 2), which are hinged to the flanges 36 and 37 in the same manner as the plates 39, and disposed between each pair of the latter. The adjacent edges of the plates and flanges are so formed that outward pivotal movement of the plates is limited to positions of substantial alignment with the flanges. At their outer edges the plates 39 and 45 curve inwardly and abut the sides of the core 17 adjacent its outer periphery when it is inflated. The plates 45 are positioned between the plates 39 to form continuous side walls for protecting the core and to provide a support for stitching the plies of tire material together. The spring hinges are so arranged that the plates will move inwardly when the core is deflated, until they assume the positions as shown by broken lines in Fig. 1.

In constructing a tire in accordance with this invention, an endless band 47 comprising a plurality of plies of tire material is positioned about the core 17, while the latter is being inflated from its position shown by the broken lines in Fig. 1. Inflation of the core causes the plates 39 and 45 to move outwardly to their positions of alignment with the flanges 36 and 37. After attaining its limit of movement laterally, determined by the plates, the core expands radially until the movement is arrested by the endless band 47, thus forming a tire chuck, the outer periphery of which is of arcuate contour in cross-section. Then beads 48 and 49 are positioned adjacent the outer edges of the band 47 which extend along the sides of the plates 39 and 45. A plurality of plies 52 of tire material and a tread portion 53 are then positioned in superposed relation upon the endless band 47 and stitched together. The edges of the plies of material are looped about the beads 48 and 49. Then, the fluid is exhausted from the core 17 through the opening 28 permitting the core to assume the collapsed position shown by the broken lines in Fig. 1 and the tire to be removed.

From the above description it is apparent that a novel method and apparatus for building a tire has been provided in which a tire may be constructed more nearly resembling the finished tire, and at the same time securing the advantages of the so-called flat method of building tires. Moreover, less strain is imposed on the plies during the final shaping of it prior to vulcanization, than is imposed in the shaping of the flat-built tire. Also, the method is very efficient because the first band of material may be disposed on the chuck even before the latter is in its operative position.

Although only the preferred form of the invention has been described and shown in detail, it will be apparent to those skilled in the art that the invention is not so limited but that various minor modifications may be made therein, without departing from the spirit of the invention or from the scope of the appended claims.

What we claim is:

1. A tire supporting chuck comprising a support, an inflatable member secured thereto, and means for controlling lateral movement of the inflatable member, said means being automatically movable in response to movement of the member during inflation and deflation thereof.

2. A tire supporting chuck comprising a support, a hub having a radially extending flange intermediate its ends, an inflatable core secured adjacent the outer periphery of the flange, and means for controlling lateral movement of the core.

3. A tire chuck comprising a support, a hub having a radially extending flange secured thereto, an inflatable core adjacent the outer periphery of the flange, and a plurality of plates operatively pivoted to the hub adjacent the core, the plates being so disposed as to form a disc for controlling the lateral movement of the core.

4. A tire supporting chuck comprising a support, an inflatable member secured thereto, and means including a plurality of hinged elements for controlling the lateral movement of the member.

5. A tire supporting chuck comprising a support, a hub having a radially extending flange intermediate its ends, an inflatable rubberized fabric core adjacent the outer periphery of the flange, means for inflating the core, and means for controlling lateral movement of the core, said last named means being automatically movable in response to movement of the core during inflation and deflation thereof.

6. A tire supporting chuck comprising a support, a hub having a radially extending flange secured thereto intermediate its ends, the flange having laterally extending projections adjacent the outer periphery thereof, a rubberized fabric core adjacent the outer periphery of the flange, means cooperating with said projections to secure said core in position, means for inflating the core, and means for controlling lateral movement of the core.

7. A tire supporting chuck comprising a support, a hub having a radially extending flange secured thereto intermediate its ends, the flange having laterally extending projections adjacent the outer periphery thereof, an inflatable core engaging the projections, means secured to the flange for maintaining the core against said projections, and means for controlling lateral movement of the core, said last named means being automatically movable in response to movement of the core during inflation and deflation thereof.

8. A tire supporting chuck comprising a support, a hub having a radially extending flange secured thereto, an inflatable core engaging the sides of the flange, means for maintaining the core in fluid tight relation with the flange, a pair of annular members associated with such means, each member having an outwardly projecting flange, and a plurality of hinged members secured to the outwardly projecting flange for controlling the movement of the core.

9. A tire supporting chuck comprising a support, a hub having a radially extending flange secured thereto, an inflatable core engaging the sides of the flange, a plurality of supporting members, each member having a laterally extending flange secured to the radially extending flange, for maintaining the core in fluid tight relation to the latter, a pair of annular members secured to the laterally extending flange, each member having an outwardly projecting portion, and a plurality of plates secured to each of the latter projecting portions.

10. A tire supporting chuck comprising a support, a hub having a radially extending flange secured thereto, an inflatable core engaging the sides of the flange, a plurality of supporting members, each member having a laterally extending flange secured to the radially extending flange, for maintaining the core in fluid tight relation to the latter, a pair of annular members secured to the laterally extending flange, each member having an outwardly projecting portion, and a plurality of plates pivotally mounted on each of the outwardly projecting portions, each of the plates having a curved surface adjacent its outer end for supporting the sides of the core.

11. A tire supporting chuck comprising a shaft, a hub secured to the shaft and having a radially extending flange, an inflatable core engaging the sides of the flange, means for maintaining the core in fluid-tight relation with the flange, a pair of rings associated with said means, each ring having an outwardly projecting flange and a plurality of hinged elements secured to each of the outwardly projecting flanges for controlling the movement of the core.

12. A tire chuck comprising a shaft, a hub having a radially extending flange secured thereto, an inflatable core adjacent the outer periphery of the flange and a plurality of plates operatively pivoted to the hub adjacent the core, the plates being so disposed as to form a disc for controlling the lateral movement of the core.

13. A tire chuck comprising a shaft, a hub having a radially extending flange secured thereto, the latter having laterally extending projections adjacent its outer periphery, an inflatable core engaging the projections, means secured to the flange for maintaining the core fluid tight, and a plurality of plates pivotally associated with such means for controlling the expansion of the core.

14. A tire chuck comprising a shaft, a hub having a radially extending flange secured thereto, an inflatable core engaging the sides of the flange, means for maintaining the core in fluid tight relation with the flange, a pair of annular members associated with the means, each member having an outwardly projecting flange, and a plurality of hinged members secured to the outwardly projecting flange for controlling the movement of the core.

JOHN F. CAMPBELL.
JAMES D. THOMSON.